Nov. 28, 1939.  F. M. REID  2,181,342
TAIL GATE STRUCTURE
Filed Feb. 2, 1939  2 Sheets-Sheet 1
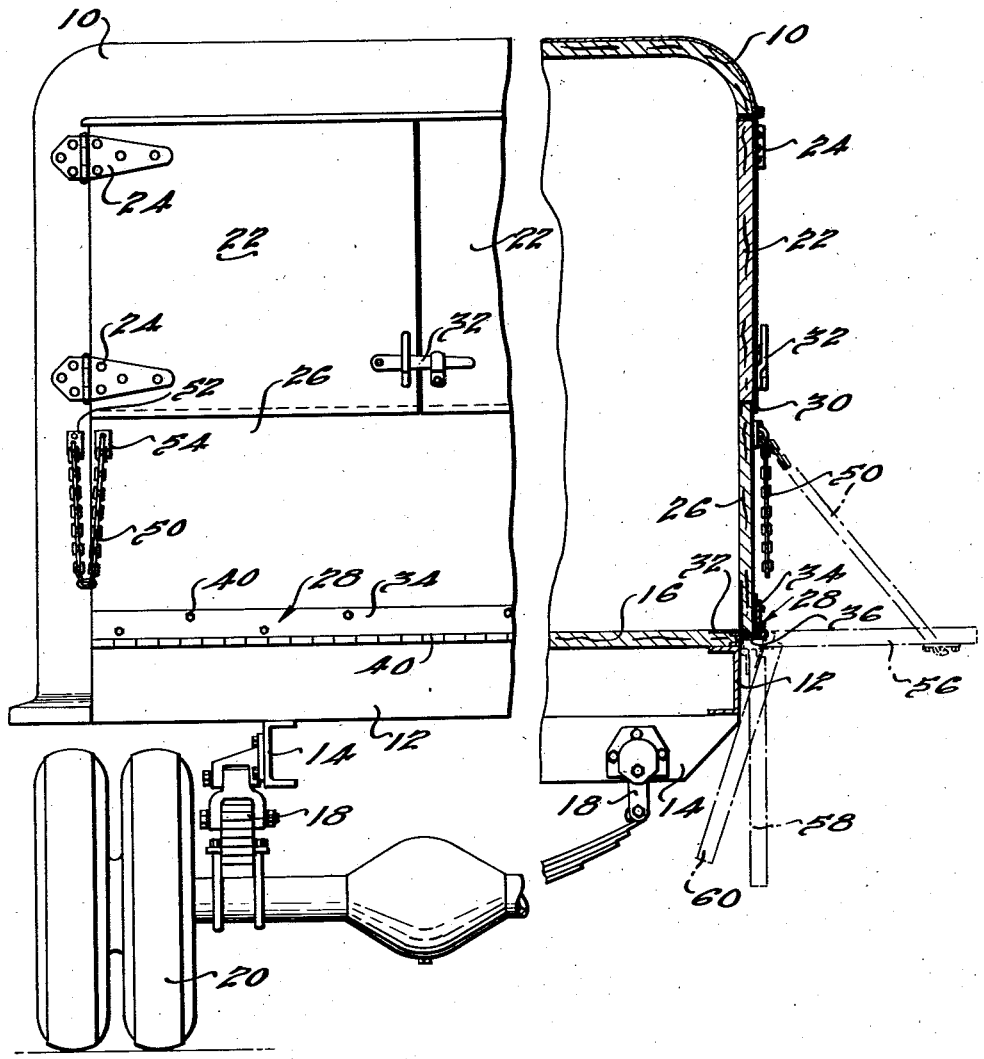
INVENTOR
Frederick M. Reid.
BY
Harness, Dickey & Pierce.
ATTORNEYS Nov. 28, 1939.  F. M. REID  2,181,342
TAIL GATE STRUCTURE
Filed Feb. 2, 1939  2 Sheets-Sheet 2
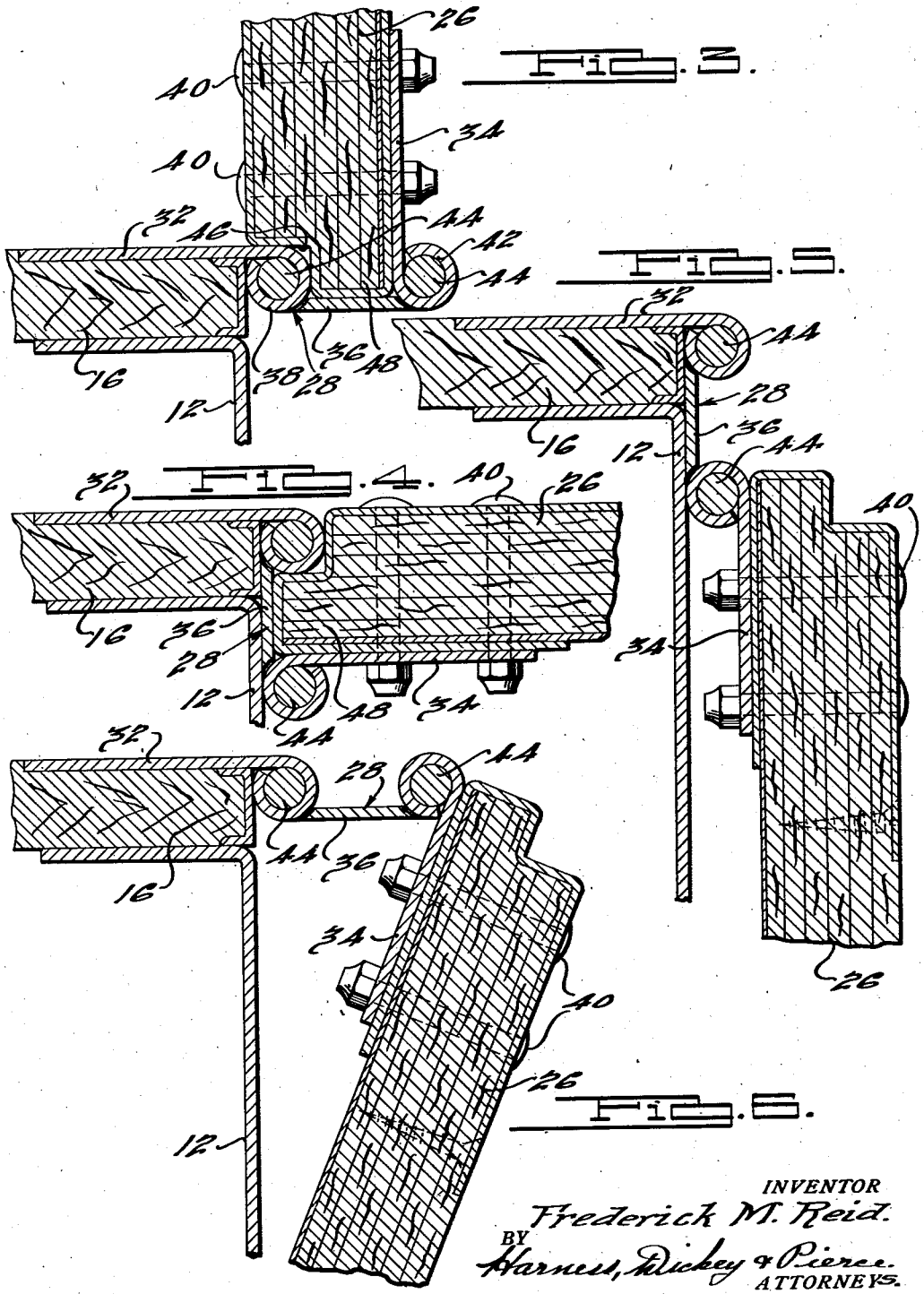
INVENTOR
Frederick M. Reid.
BY Harness, Dickey & Pierce
ATTORNEYS.

Patented Nov. 28, 1939

2,181,342

UNITED STATES PATENT OFFICE 2,181,342

TAIL GATE STRUCTURE

Frederick M. Reid, Detroit, Mich., assignor to Fruehauf Trailer Company, Detroit, Mich., a corporation of Michigan Application February 2, 1939, Serial No. 254,175

4 Claims. (Cl. 296—57)

This invention relates to vehicle tail gates and particularly relates to the manner in which the tail gate is hingedly mounted on the vehicle.

One of the primary objects of the present invention is to provide a tail gate hinge structure which permits abutting of the gate directly against the frame when acting as a bumper in backing without injury to the hinge.

Another object of the invention is the provision of a hinge structure including an intermediate link in which there are never any bending stresses on the hinge parts but all stresses are in direct tension, sheer or compression.

Another object of the invention is to provide a hinge structure for the tail gate having an intermediate link in which the butt of one hinge acts as a wear strip for the rear edge of the vehicle floor and the butt of the other hinge reinforces one edge of the tail gate.

Another object of the invention is the provision of a tail gate hinge construction of such a character that when the tail gate is open and the outer end is supported by a chain, the force of gravity pulls the inner edge of the tail gate against the frame.

Another object of the invention is to provide a tail gate associated with over-doors which overlap the upper edge of the gate and prevent it from vertical movement while the vehicle is in travel.

Another object of the invention is to provide a hinge structure for a vehicle body tail gate that will so position the top face of the gate that same is on the same level as the main body platform when the gate is extended horizontally, with no step or gap at juncture of the tail gate and main platform to interfere with sliding or rolling loading.

Another object is to provide a tail gate for a vehicle body that has a step-shaped bottom edge, the upper step abutting the body platform in closed position, and the lower step extending below the floor level and abutting an intermediate hinge plate, thereby forming a doubly sealed closure.

A further object of the invention is to provide a tail gate hinge construction which, when the door is closed, the hinges do not take the load in bumping except as direct compression.

A further object of the invention is to provide a tail gate hinge construction having double hinges and an intermediate link, which permits the tail gate to swing all the way down and the double pins act as links so that when the tail gate is struck below the hinge, the gate and intermediate link swing and thereby relieve the hinges of any bending strain.

A further object of the invention is to provide an improved tail gate hinge construction which is strong and durable and which will stand up well in use.

Other objects of the invention will become apparent from the following specification, the drawings relating thereto, and from the claims hereinafter set forth.

In the drawings, in which like numerals are used to designate like parts in the several views throughout:

Figure 1 is a fragmentary, rear elevational view of a vehicle having a tail gate hingedly mounted thereon according to the present invention, and showing the tail gate closed;

Fig. 2 is a fragmentary, vertical cross-sectional view of the structure shown in Fig. 1;

Fig. 3 is an enlarged, fragmentary, cross-sectional view showing a portion of the vehicle floor, a portion of the tail gate, and the manner in which the tail gate is hinged to the vehicle floor, with the tail gate in its closed position;

Fig. 4 is a view similar to Fig. 3, showing the tail gate in another position;

Fig. 5 is a view similar to Fig. 3, showing the tail gate in still another position; and Fig. 6 is a view similar to Fig. 3, showing the tail gate in another position.

In tail gate constructions for vehicles such as trucks, trailers, and semi-trailers, the hinge means associated with such constructions are subjected to hard usage because the tail gate is sometimes used as a bumper when backing the vehicle against a loading platform or pier. Also, the tail gate is often swung down, and when bumped in such position, severe bending stresses are applied to the hinge. According to the present invention, a tail gate is so hingedly mounted to the vehicle that all stresses on the hinge are in direct tension, sheer or compression, and are never bending stresses. With this construction a durable hinge is provided which stands up well under the hard usage to which it is put.

For a better understanding of the invention reference may be had to the drawings in which one preferred embodiment of the construction is illustrated. The rear end of a vehicle is illustrated at 10, which may be a truck, trailer, or semi-trailer and which is open at the rear end to provide access to the interior thereof. The truck is supported on frame members which include a transversely extending frame member 12 located adjacent the rear edge of the floor 16 of the vehicle. Longitudinally extending frame members 14 are provided which may extend to a position adjacent the rear edge of the truck, and such frame members have associated therewith suitable wheel suspension means 18 which serve to mount the usual ground wheels 20.

The opening through the rear end of the vehicle 10 is closed by a pair of over-doors 22 hingedly mounted adjacent their outer side edges by suitable door hinges 24. A tail gate 26 completes the enclosure and such tail gate is hingedly mounted to the floor 16 adjacent the rear thereof by a hinge construction, generally indicated at 28, according to the present invention. The lower outer edge 30 of the over-doors 22 overlaps the upper edge of the tail gate 26 so that the tail gate is held against outward movement when the doors are closed and is prevented from up and down movement. Suitable, releasable latch means, such as those indicated at 32, are associated with the doors 22 to keep such doors closed.

The hinge means for pivotally mounting the tail gate 26 to the floor 16 of the vehicle comprises a first hinge part 32, a second hinge part 34, and an intermediate link member 36. The hinge part 32 is in the form of a plate member extending transversely of the vehicle floor and positioned so that the butt of the member 32 rests upon and is fixed to the top edge of the floor 16 adjacent the rear thereof. The outer edge of the member 32 is formed to provide alternate knuckles 38 and spaces therebetween; and the hinge part is so formed that the knuckles lie under the level of the top surface of the floor and are positioned adjacent the rear edge of the floor. The member 32 thus serves as a wear plate adjacent the rear edge of the floor and also reinforces the floor to which it may be suitably attached.

The hinge part 34 is similar in construction to the hinge part 32 and is fixed to the outer or lower surface of the tail gate 26 adjacent the inner or lower edge thereof by means of suitable bolts 40. The member 34 thus reinforces the tail gate; and such member is formed with alternate knuckles 42 and spaces therebetween. The knuckles 32 are so constructed and the plate 34 is so positioned that the lower ends of the knuckle lie slightly below the lower edge of the tail gate for a purpose that will be described more in detail hereinafter.

The intermediate link member 36, which is in the form of a plate extending transversely of the vehicle, has its opposite edges formed with complementary knuckles and spaces, which cooperate with the spaces and knuckles, respectively, of the plate members 32 and 34, respectively, to provide pivotal hinge joints between the link member and the members 32 and 34. Pivot pins 44 extend through the eyes formed by the knuckles 38 and 42 and the knuckles on the edges of the link member 36 so as to pivotally connect the link member to the members 32 and 34. This construction is in effect a double piano type hinge in which the link member 36 is pivotally mounted with respect to the plate members 32 and 34.

The inner corner of the lower edge of the tail gate 26 is cut out, as indicated at 46, transversely thereof to provide a shouldered projection 48. The projection 48 has a width substantially the same as the length of the link 36 between the knuckles and the depth of the shoulder 46 is substantially the depth of the knuckles so that the shoulder is adapted to bear against the plate member 32 and the edge of the projection abuts against the link plate 36 when the tail gate is in certain positions.

The tail gate 26 is shown in its vertical, or closed, position in Fig. 3, and it will be seen that when it is in such position the projection 48 abuts the link member 36 and the shoulder 46 bears on the top surface of plate 32. This results in two lines of contact between the tail gate 26 and the floor or platform 16 which is extremely effective as a dust seal when the tail gate 26 is closed. The gate will be prevented from outward movement and also upward and downward movement due to the relationship of the overlap 30 on the over-doors with the upper, outer edge of the tail gate. In the event that the vehicle is bumped against a loading platform or pier while the gate is in this position, it will be evident that the stress on the hinge will be in direct compression through the link 36 which is transferred directly to the vehicle body.

In Fig. 4 the gate 26 is shown in its open, substantially horizontal position. When in such position, supporting means in the form of the usual chain 50 are provided at each side of the gate which are connected at one end to a bracket 52 on the vehicle and at the other end to a bracket 54 which is secured to the tail gate adjacent the outer edge thereof.

When the tail gate is in this position, it will be seen that the link 36 swings downwardly to a substantially vertical position where it abuts against the frame member 12. The projection 48 of the tail gate abuts directly against the link 36; and when the vehicle is backed into a loading platform, any bumping stresses are applied directed against the link and against the vehicle frame member 12. This position is shown by broken line 56 in Fig. 2. The force of gravity insures abutment of the gate against link plate 36 in the position shown and eliminates any gap that might otherwise occur between it and the vehicle platform 16. It will be noted that the relation of the various parts of the hinge structure is such that when the tail gate 26 is open and horizontal its upper surface is flush with the upper surface of the platform 16. The structure thus eliminates all gaps and steps between the platform and tail gate and thus no obstructions are provided at their junction to obstruct the sliding or rolling of articles from one to the other.

Referring to Figs. 5 and 6, the tail gate is shown when it is dropped downwardly to a substantially vertical position. The positions corresponding to those shown in Figs. 5 and 6 are shown by broken lines 58 and 60, respectively, in Fig. 2. When the vehicle backs up and the lower end of the tail gate 26 strikes against an object, such as a pier, the tail gate moves from the position shown in Fig. 5 to that shown in Fig. 6. In this movement the link 36 swings outwardly from its downward vertical position to a substantially horizontal position so that any force applied to the tail gate by this bumping action is transferred to the hinge mechanism in direct tension in the link member 36. This movement relieves the hinge construction of any severe bending stresses which would be present in the prior types of hinge constructions.

From the above, it will be evident that the present invention provides an improved manner of hingedly mounting a vehicle tail gate to a vehicle and provides a construction which may be subjected to hard usage without damage to the hinge construction.

Formal changes may be made in the specific embodiment of the invention described without departing from the spirit and substance of the invention and which is commensurate with the appended claims.

What is claimed is:

1. A vehicle tail gate and tail gate mounting comprising, in combination, a vehicle having a floor, a tail gate associated with said floor, hinge means pivotally mounting said tail gate to said floor adjacent the rear edge thereof, said hinge means comprising a first hinge plate secured to said floor adjacent the rear edge thereof, a second hinge plate secured to said tail gate adjacent one hinge edge thereof, an intermediate link member having opposite edges thereof pivotally connected to said first and second hinge plates respectively, and said tail gate having said one edge constructed with a projecting portion which is adapted to abut against said intermediate link member.

2. A vehicle tail gate and tail gate mounting comprising, in combination, a vehicle having a floor, a tail gate associated with said floor, hinge means pivotally mounting said tail gate to said floor adjacent the rear edge thereof, said hinge means comprising a first hinge plate secured to said floor adjacent the rear edge thereof, a second hinge plate secured to said tail gate adjacent one edge thereof, an intermediate link member having opposite edges thereof pivotally connected to said first and second hinge plates respectively, and said one edge of said tail gate being constructed with a projection adapted to abut against said intermediate link member and formed with an inset adapted to bear against said first hinge plate.

3. A vehicle tail gate and tail gate mounting comprising, in combination, a vehicle having a floor, a tail gate associated with said floor, hinge means pivotally mounting said tail gate to said floor adjacent the rear thereof, said hinge means comprising a first hinge plate secured to said floor adjacent the rear edge thereof, a second hinge plate secured to said tail gate adjacent one edge thereof, an intermediate link member having opposite edges thereof pivotally connected to said first and second hinge plates respectively, said one edge of said tail gate having a corner removed transversely thereof providing a shouldered projecting portion, said projecting portion being so constructed as to bear against said link member between the pivotal connections of said link member with said first and second hinge plates.

4. A vehicle tail gate and tail gate mounting comprising, in combination, a vehicle having a floor, a frame member disposed under said floor adjacent the rear edge thereof, a tail gate associated with said floor, hinge means pivotally mounting said tail gate to said floor adjacent the rear edge thereof, said hinge means comprising a first hinge plate secured to said floor adjacent the rear edge thereof, a second hinge plate secured to said tail gate adjacent one edge thereof, an intermediate link member having opposite edges thereof pivotally connected to said first and second hinge plates respectively, means connected to said vehicle and said tail gate supporting said tail gate in an open, substantially horizontal position, the construction and arrangement of said hinge means relative to said floor, said frame member, said tail gate, and said last named means being such that the force of gravity urges said one edge of said tail gate into abutting relation with said link member and the surface of said link member adjacent said frame member abuts flush against said frame member when said tail gate is in said open, substantially horizontal position.

FREDERICK M. REID.